(12) United States Patent
Maine

(10) Patent No.: US 9,543,094 B2
(45) Date of Patent: Jan. 10, 2017

(54) EXTENSION MEMBER FOR ROTARY SWITCH ACTUATION

(71) Applicant: Maine Technical Services, Inc., Clinton, NY (US)

(72) Inventor: Timothy F. Maine, Clinton, NY (US)

(73) Assignee: Maine Technical Services, Inc., Clinton, NY (US)

( * ) Notice: Subject to any disclaimer, the term of this patent is extended or adjusted under 35 U.S.C. 154(b) by 0 days.

(21) Appl. No.: 14/704,265

(22) Filed: May 5, 2015

(65) Prior Publication Data

US 2015/0318127 A1 Nov. 5, 2015

Related U.S. Application Data

(60) Provisional application No. 61/988,422, filed on May 5, 2014.

(51) Int. Cl.
| | |
|---|---|
| *H01H 3/20* | (2006.01) |
| *H01H 23/14* | (2006.01) |
| *H01H 19/14* | (2006.01) |
| *H02B 1/00* | (2006.01) |
| H01H 9/28 | (2006.01) |
| H01H 19/36 | (2006.01) |

(52) U.S. Cl.
CPC ........... *H01H 23/141* (2013.01); *H01H 19/14* (2013.01); *H02B 1/00* (2013.01); *H01H 9/281* (2013.01); *H01H 9/287* (2013.01); *H01H 19/36* (2013.01)

(58) Field of Classification Search
CPC ............ H01H 9/20; H01H 9/22; H01H 9/226; H01H 31/006

USPC ............................. 200/50.05, 329, 330, 331
See application file for complete search history.

(56) References Cited

U.S. PATENT DOCUMENTS

| | | | |
|---|---|---|---|
| 1,733,126 A | 10/1929 | Johansson | |
| 2,418,006 A | 3/1947 | Bangert, Jr. | |
| 3,272,953 A * | 9/1966 | Tillson | H01H 3/04 |
| | | | 200/330 |
| 3,365,535 A | 1/1968 | Wilk | |
| 4,324,961 A | 4/1982 | Ristuccia et al. | |
| 4,454,401 A | 6/1984 | Powis, Jr. | |

(Continued)

*Primary Examiner* — Vanessa Girardi
(74) *Attorney, Agent, or Firm* — Hoffman Warnick LLC; Devin S. Morgan

(57) ABSTRACT

The disclosure describes a switch extension device and method of installing such a device on a unit of electrical equipment with a closable housing containing a switch and electrically charged components, such as a transformer with a rotary oil safety switch inside the transformer terminal cabinet. The device includes a switch coupling member for mechanically manipulating a switch between at least a first switch position and a second switch position. The switch is disposed inside the closed housing containing components that are electrically charged when the switch is in the first position and not electrically charged when the switch is in the second position. The device also has an extension member with an external portion that extends outside of the closed housing for access by the user without opening the closed housing. Physical manipulation of the external portion of the extension member is mechanically translated to the switch coupling member for mechanically manipulating the switch between at least the first switch position and the second switch position.

23 Claims, 10 Drawing Sheets

(56) References Cited

U.S. PATENT DOCUMENTS

| | | | |
|---|---|---|---|
| 4,591,816 A | 5/1986 | Mikulecky et al. | |
| 5,593,196 A | 1/1997 | Baum et al. | |
| 6,403,903 B1 | 6/2002 | Montano et al. | |
| 6,432,912 B1 * | 8/2002 | Rodelet | A61K 8/375 424/76.4 |
| 6,667,438 B2 | 12/2003 | Schneider et al. | |
| 7,142,410 B2 | 11/2006 | Norris et al. | |

* cited by examiner

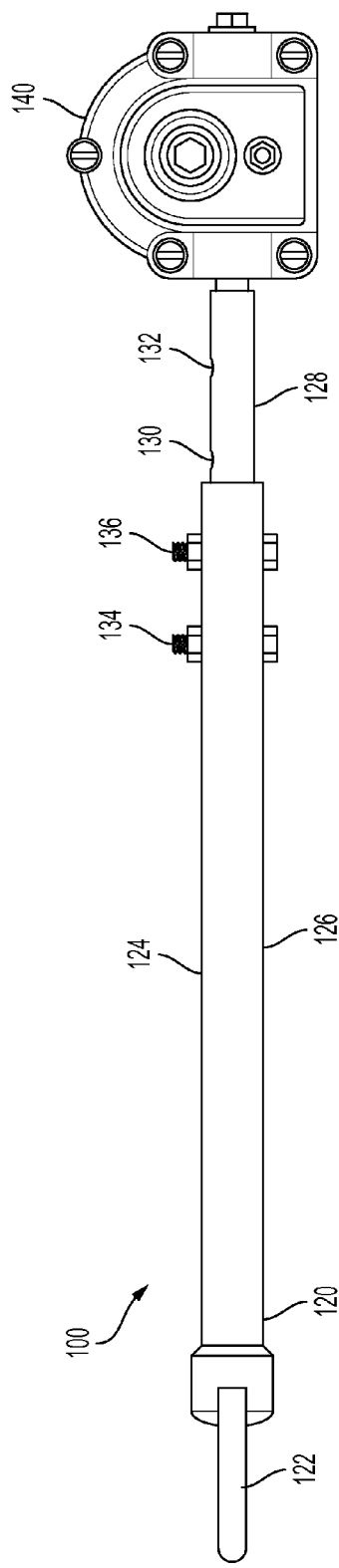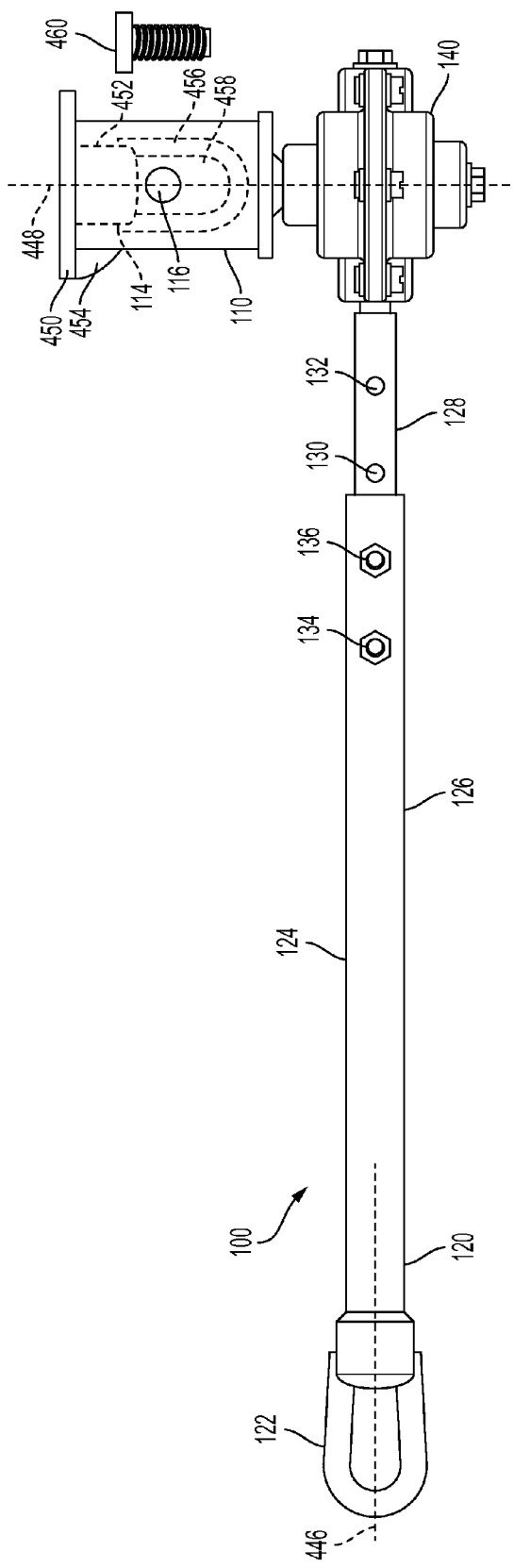

EXTENSION MEMBER FOR ROTARY SWITCH ACTUATION

RELATED APPLICATIONS

This application claims priority from U.S. Provisional Application No. 61/988,422 filed May 5, 2014.

FIELD

The invention relates to the field of safety devices for electrical equipment and, more specifically, safely actuating switches adjacent electrically charged components of electrical equipment.

BACKGROUND

Distribution and storage of electricity are critical aspects of modern infrastructure. Power distribution includes the transmission of power at high voltage. Once power is generated it is conditioned and transformed for transmission to remote users of power. As these high current and voltage power sources reach their destinations, they must be adjusted to the needs of the loads that will use them, whether that be residential or commercial standards, or more esoteric industrial loads. Transformers are critical component in these systems for adjusting the voltage between generation, distribution, and use of electrical power. Like all electrical equipment, transformers and the systems of which they are a part require periodic service.

Many transformers include an oil switch that must be toggled or rotated to the off position before the transformer can safely be serviced. For example, any enclosed pad mount transformers with an oil switch in the terminal cabinet will require manipulation of the oil switch before service. Unfortunately, this oil switch is often disposed within the transformer housing, located within the transformer terminal cabinet. Because this internal area of the transformer also includes active high-voltage components, it is a significant risk to the technician servicing the transformer to open the housing and access the oil switch.

In order to service a transformer with an internal oil switch, the technician must first open an access panel, generally a hinged and lockable door, that provides access to the transformer terminal cabinet within the transformer housing. Among the active electrical components in the transformer terminal cabinet, is a rotary oil switch that is rotated to be able to safely power down the transformer for service. The rotary oil switch is then turned by hand or using an electrical service hot stick with a hooked end to engage a loop or other feature on the oil switch. Once the switch is fully in the off position, service on the transformer unit can proceed.

Accidental contact with the active electrical components within the transformer cabinet is extremely dangerous to the technician and can result in fatal injury. Danger may be particularly high in older equipment where safety features, such as insulation, of the exposed electrical components have degraded. While service technicians are highly trained in understanding these risks, routine exposure tends to reduce their safety mindedness. Once a hand is within the cabinet in the vicinity of the exposed electrical components, any number of circumstances can cause accidental contact with active electrical components and resulting injury or death.

While transformer cabinets could be designed with a safety switch in a separate access panel, that is not the standard configuration. Even if this change was made in the industry, there would still be the vast installed base of transformers that do not include such a feature and will need to be safely serviced for many years to come.

SUMMARY

Technical Problem

There is a need for a device and method of operating the safety switch adjacent electrically charged components of electrical equipment, that is simpler, more reliable, and safer for electrical service technicians.

Solution to Problem

The present invention is a switch extension to allow a technician to manipulate a safety switch from outside the housing of the electrical equipment that contains the active electrical components and is installed in the electrical equipment for use by service technicians. More specifically, one aspect of the invention is a device with a switch coupling member for mechanically manipulating a switch between at least a first switch position and a second switch position. The switch is disposed inside the closed housing containing components that are electrically charged when the switch is in the first position and not electrically charged when the switch is in the second position. The device also has an extension member with an external portion that extends outside of the closed housing for access by the user without opening the closed housing. Physical manipulation of the external portion of the extension member is mechanically translated to the switch coupling member for mechanically manipulating the switch between at least the first switch position and the second switch position.

The device may include a switch coupling member that accommodates a rotary switch and mechanically manipulating the switch comprises rotating the switch between the first switch position and the second switch position. For example, the switch coupling member may be a cylindrical cup where the internal diameter is greater than the diameter of the rotating portion of the rotary switch and the cylindrical cup includes a switch manipulation feature such that rotation of the cylindrical cup rotates the rotating portion of the rotary switch. A slot in the cylindrical cup that accommodates a flange extending from the rotating portion of the rotary switch would be one embodiment. The switch coupling member may also include a fastener that attaches the switch coupling member to the switch. For example, the switch may include a switch through hole, the switch coupling member may include a coupling member through hole, and the fastener could be a bolt that extends through the switch through hole and the coupling through hole.

The device may include a handle for physical manipulation by a user as the external portion of the extension member. In one embodiment, the switch has a switch structure for direct physical manipulation of the switch and the handle has a handle structure for physical manipulation by a user and the switch structure and the handle structure are functionally equivalent structures.

In one embodiment, an external switch box is disposed outside of the closed housing and the external portion of the extension member extends into the external switch box. The external switch box may then include a lock for preventing manipulation of the external portion of the extension member by an unauthorized user.

Some embodiments of the device may include a stabilizing extension. The stabilizing extension may include a guide member for engaging and supporting the extension member, an anchor assembly for anchoring the stabilizing extension to a portion of the closed housing, and a supporting member extending from the guide member to the anchor assembly and providing support from the closed housing to the extension member.

Some embodiments of the device may have an extension member with an adjustable length and a setting mechanism for setting the adjustable length to a desired length during installation. For example, the extension member may have a first telescoping portion and a second telescoping portion in a telescoping arrangement for adjusting the adjustable length. The setting mechanism may be a removable pin extending through a first hole in the first telescoping portion and an aligned second hole in the second telescoping portion when the adjustable length is locked to the desired length. A bolt may be used as the removable pin and secured with a nut.

Some embodiments of the device include an angular junction in the extension member whereby an angle of the mechanical manipulation of the switch by the switch coupling member is different from an angle of the physical manipulation of the external portion of the extension member. For example, the angular junction may be a gear box for translating rotational motion from the external portion of the extension member to rotational motion of the switch coupling member and the switch. In one embodiment, the angle of the mechanical manipulation of the switch by the switch coupling member and the angle of the physical manipulation of the external portion of the extension member is different by 90 degrees. For example, the axis of rotation of the switch is different by 90 degrees from the axis of rotation of the extension member.

The device may be part of a switch extension kit. The kit could include the switch extension device made of a switch coupling member and an extension member, and an external switch box. The switch extension device may be installed within a closeable housing containing components that are electrically charged when the switch is in the first position and not electrically charged when the switch is in the second position. The extension member could have an external portion that extends outside of the closable housing for access by a user without opening the closed housing and whereby physical manipulation of the external portion of the extension member is mechanically translated to the switch coupling member for mechanically manipulating the switch between at least the first switch position and the second switch position. The kit could also include a stabilizing extension for the switch extension device made of a guide member for engaging and supporting the extension member, an anchor assembly for anchoring the stabilizing extension to a portion of the closable housing, and a supporting member extending from the guide member to the anchor assembly and providing support from the closable housing to the extension member. The kit could include an angular junction for the switch extension device whereby an angle of the mechanical manipulation of the switch by the switch coupling member is different from an angle of the physical manipulation of the external portion of the extension member.

Another embodiment of the invention is a method of installing a switch extension device. A user opens a closable housing containing a switch and components that are electrically charged when the switch is in the first position and not electrically charged when the switch is in the second position. The user then identifies a path for the switch extension device and prepares a permanent opening in the closable housing for the switch extension device to extend from the interior of the closable housing to the exterior of the closable housing. The user mates the switch coupling member of the switch extension device with the switch such that the extension member of the switch extension device extends through the permanent opening in the closable housing and exposes the external portion of the extension member on the exterior of the closable housing. The user then closes the closable housing. The external portion of the extension member may then be accessed by any future user without opening the closed closeable housing and physical manipulation of the external portion of the extension member is mechanically translated to the switch coupling member for mechanically manipulating the switch between at least the first switch position and the second switch position. The method may also include installing an external switch box that is disposed on the exterior of the closed closable housing and the external portion of the extension member extends into the external switch box. Where necessary, the method may also include installing a stabilizing extension for the switch extension device by placing the extension member through a guide member of the stabilizing extension and anchoring the stabilizing extension to a portion of the closable housing, whereby the stabilizing extension provides support from the closable housing to the extension member. In some installations, the path for the switch extension device may include a difference between the angle of the mechanical manipulation of the switch by the switch coupling member and the angle of the physical manipulation of the external portion of the extension member and the switch extension device further comprises an angular junction for translating the physical manipulation of the external portion of the extension member to mechanical manipulation of the switch by the switch coupling member.

Advantageous Effects of Invention

The present invention will provide improved safety for electrical service technicians using the switch extension.

A first perspective of a switch extension device in accordance with the present invention.

FIG. 2

Figure 1:
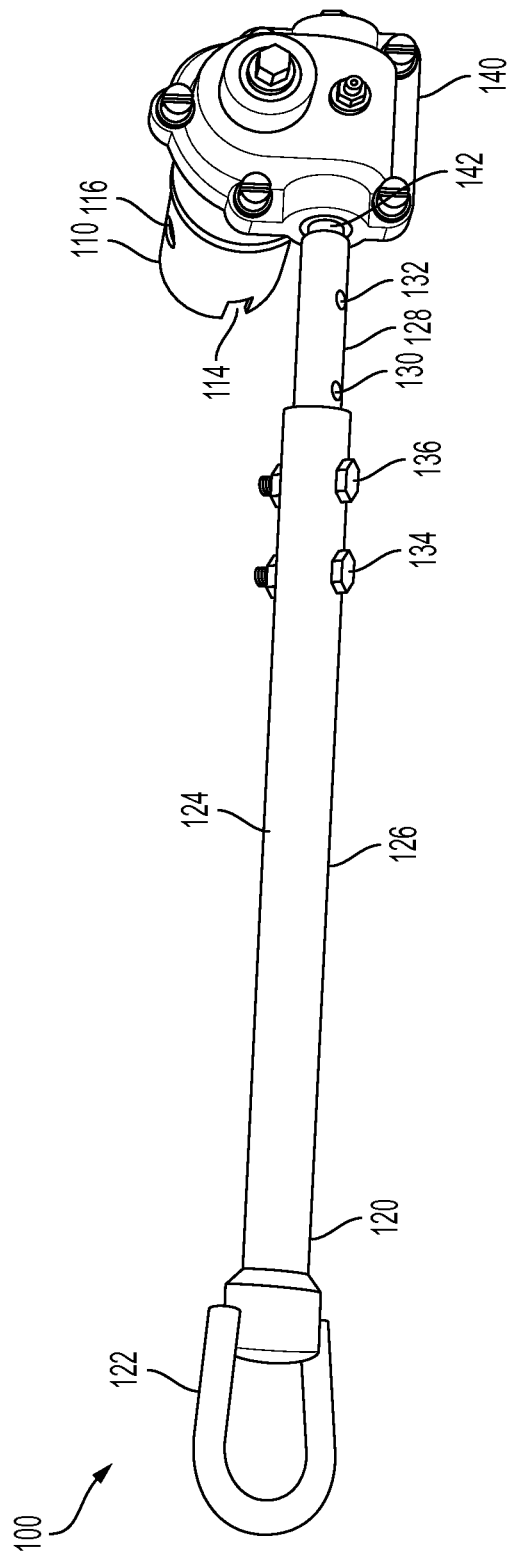
FIG. 1
Figure 2:
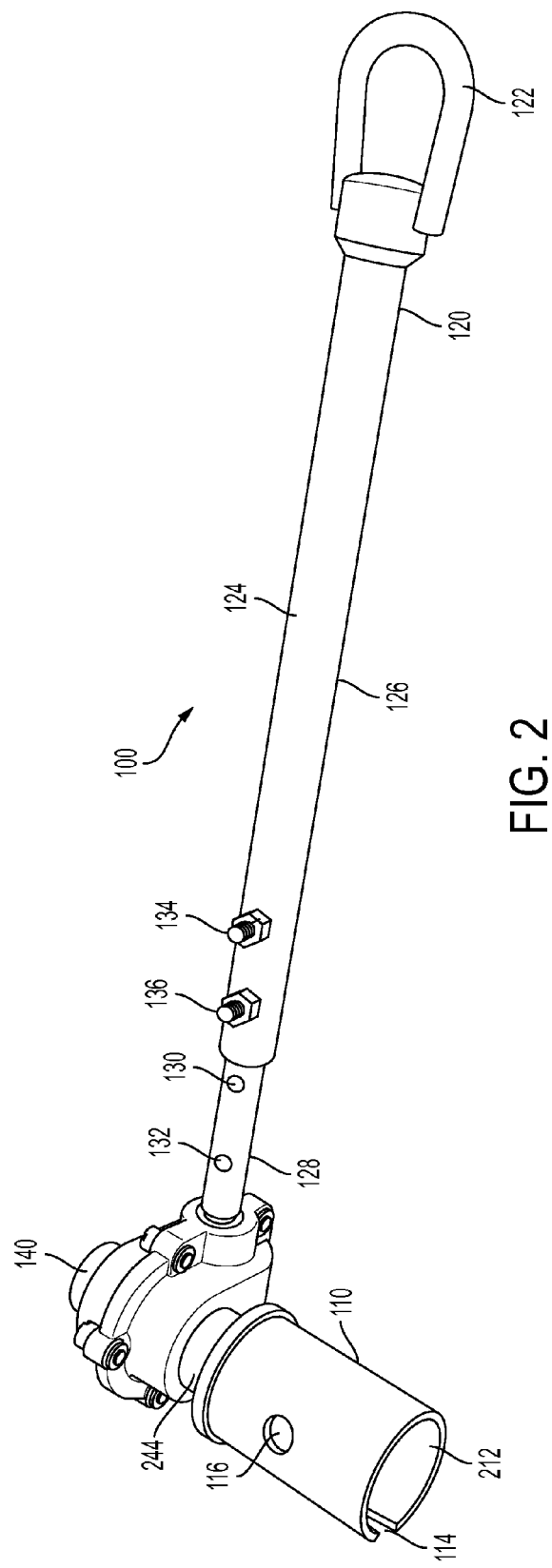

A second perspective of the switch extension device of FIG. 1 in accordance with the present invention.

FIG. 3

A rear view of the switch extension device of FIG. 1 in accordance with the present invention.

FIG. 4

A top view of the switch extension device of FIG. 1 engaged to a rotary switch in accordance with the present invention.

FIG. 5

A perspective view of the switch extension device of FIG. 1 installed on the switch of an example unit of electrical equipment with a closable housing in accordance with the present invention.

FIG. 6

A first perspective of a switch extension device in accordance with the present invention.

FIG. 7

Figure 6:
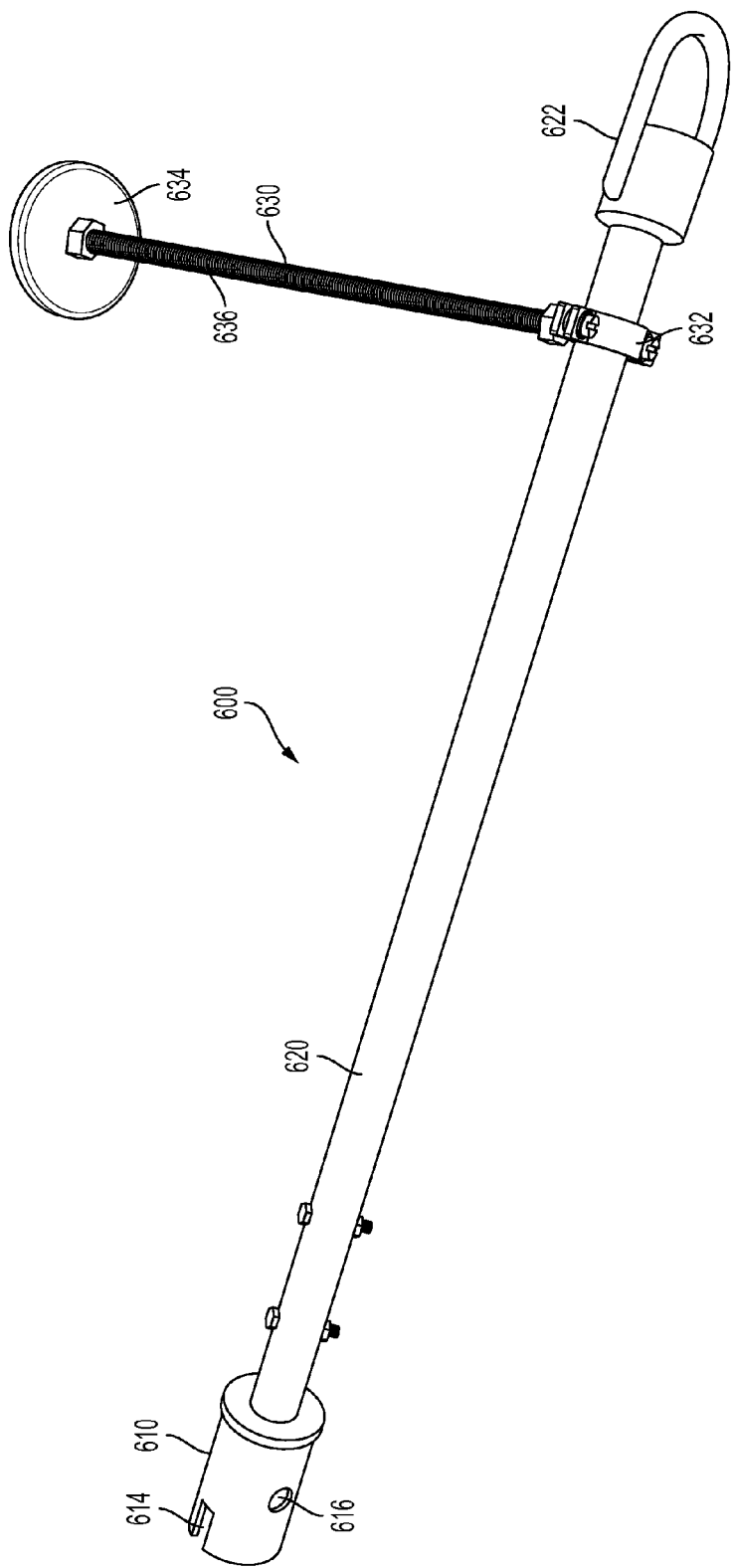
Figure 7:
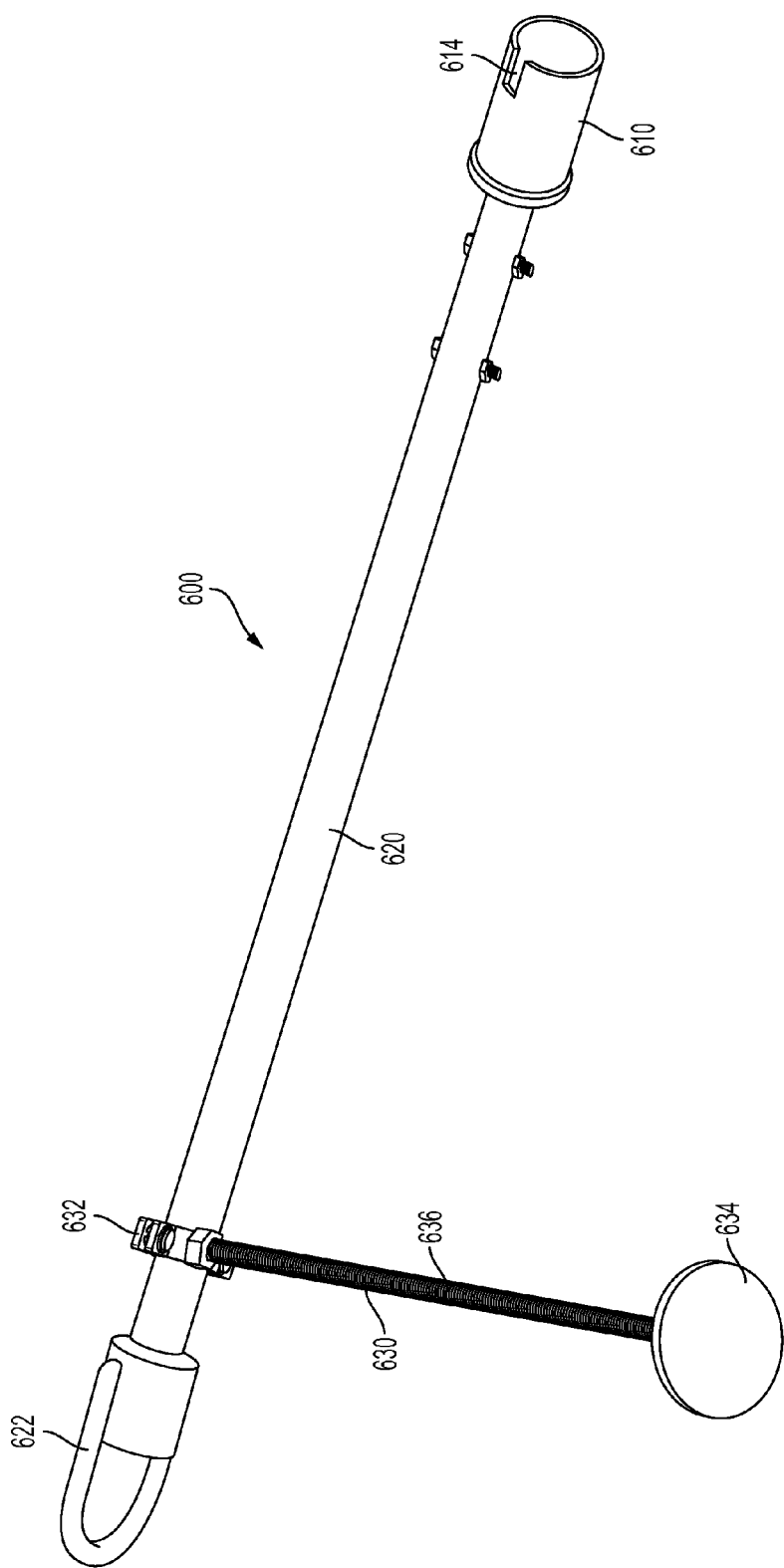

A second perspective of the switch extension device of FIG. 6 in accordance with the present invention.

FIG. 8

A bottom view of the switch extension device of FIG. 6 engaged to a rotary switch in accordance with the present invention.

FIG. 9

A side view of the switch extension device of FIG. 6 in accordance with the present invention.

FIG. 10

A cutaway perspective view of the switch extension device of FIG. 6 installed on the switch of an example unit of electrical equipment with a closable housing in accordance with the present invention.

FIG. 11

A block diagram of a method of installing a switch extension device in accordance with the present invention.

DESCRIPTION OF EMBODIMENTS

The present invention relates to a switch extension that can be installed in a unit of electrical equipment, such as a transformer, to provide an external switch that can be toggled without opening the original housing of the electrical equipment or exposing the technician to live, high-voltage components. Once the switch extension is installed, the external switch is generally placed inside a weatherproof and lockable switch box on the outside of the transformer for safe operation of the internal switch, such as a rotary oil switch. Movement of the external switch is translated through the switch extension to toggle the internal oil switch.

One use of the invention is as an aftermarket modification to transformers that have already been installed and are operating in the field. Due to the variety of transformer housing configurations, individual installations, and preferred access points for the external switch, it is desirable to have a switch extension that is customizable in the field for the particular transformer situation. The switch extension can include one or more adjustable members to control the length of the extension and match the distance between the internal switch and the external switch box. In addition, the switch extension may include an angular adjustment such that the external switch box may be on a housing surface that is not parallel with the internal switch surface. For example, a right angle device may be used to place the external switch on a surface perpendicular to the internal switch surface. Other angular configurations are possible for accommodating unusual housing designs or further translating the external switch location.

The switch extension device may be made out of steel, fiberglass, or other rigid materials that allow the necessary mechanical strength and integrity for reliably operating the internal switch. Use of non-conducting materials provides additional safety benefits in the event that the switch extension comes too close to high voltage components.

FIGS. 1-5 show one embodiment of the switch extension device. The switch extension device 100 includes a switch coupling member 110, which is the portion of the device that mechanically engages the internal switch of the electrical equipment for moving it between positions, such as an off and on position. In the embodiment shown, the switch coupling member 110 is a cylindrical cup that slides over the internal switch and may include additional features for engaging with and being attached to the switch. The cylindrical cup design is made for rotary switches that are generally moved a quarter or half turn between on and off switch positions. In the example shown, the switch coupling member has an internal surface 212 that defines a shape (round), internal diameter, and cup depth (the internal length of the cylindrical cup) for physically accommodating the switch, which has a rotating portion with an external diameter that is less than the internal diameter of the switch coupling member 110. The switch coupling member 110 further includes a switch manipulation feature, such as a slot 114 that accommodates a flange on the rotary switch and enables rotation of the switch coupling member 110 to rotate the switch. Most transformer oil switches are operated by rotating a ½ or ¼ turn clockwise or counter-clockwise to turn them on or off. The switch coupling member must be capable of controllably translating rotational motion to the oil switch to operate it. When the cylindrical cup of the switch coupling member 110 rotates, the rotating portion of the rotary switch moves as well. The switch coupling member 110 also includes features for attaching the switch coupling member 110 to the switch. For example, the switch coupling member 110 may include a switch coupling through hole 116. If the switch has a switch through hole, then a removable fastener, such as a bolt (with or without a nut), may be used to attach to the switch.

FIG. 4 shows the switch coupling member 110 engaged with an example rotary oil switch 450. The rotating portion 452 extends into the switch coupling member 110 and includes a flange 454 that is accommodated in the slot 114. The switch 450 also includes a handle 456 defining a switch through hole 458. Using the fastener 460, the switch engaging portion is anchored to the oil switch during installation. The fastener 460 is inserted through the switch coupling through hole 116 (or holes) in the cylindrical cup, also passing through an opening (switch through hole 458) in the oil switch handle 456.

The switch coupling member 110 is attached to an extension member 120. The extension member 120 is the portion of the device that extends from the switch coupling member 110 to the distal end away from the switch coupling member 110. In the embodiment shown in FIGS. 1-5, the extension member 120 ends in a handle 122 that would be the external portion of the extension member that would be accessible outside of the housing of the electrical equipment in which the switch extension device 100 is installed. The end feature of the extension member 120, the handle 122 in the example embodiment, is shaped to make it easier to physically manipulate for turning the switch off or on. The example handle 122, uses a simple loop structure that is easy for a user to manipulate directly by hand and is familiar to users because it mimics the loop structure of some switches. Service technicians may also have tools that are designed to engage with such structures. However, a variety of alternative end features are possible, including more ergonomic handles or structures for mating with specific tool interfaces or removable handles. The end portion of the extension member 120, whether it is a handle or some other structure, extends outside the housing of the electrical equipment and provides and external switch with actuation tied to the internal switch through the switch extension device 100.

Attached to the handle 122 is an adjustable length body 124 that comprises the majority of the length of the extension member 120 in order to traverse the distance from the switch to an exterior wall of the housing of the electrical equipment. The desired length is the length necessary to enable the switch coupling member 110 to mechanically engage and actuate the switch while allowing the adjustable length body 124 to extend through the exterior wall and place the handle 122 outside the electrical equipment housing. In the embodiment shown, the adjustable length body 124 includes a first telescoping portion 126 and a second telescoping portion 128. The second telescoping portion 128 fits inside the first telescoping portion 126 in a telescoping relationship that allows them to move in sliding engagement to adjust the length of the adjustable length body 124. While the embodiment shown includes only two telescoping portions, larger number of telescoping portions could be used to achieve the desired variability in length while maintaining the rigidity necessary for the application. A variety of setting mechanisms are available for telescoping bodies, such as friction, magnetic, and twisting locks that maintain the telescoping portions at a desired length. In the embodiment shown, the setting mechanism uses a simple arrangement of evenly spaced through holes, for example through holes 130, 132, in both telescoping portions. When the through holes are in alignment at the desired length, removable pins 134, 136 are placed through the matched set of through holes in both telescoping portions. In the embodiment shown, the removable pins 134, 136 are threaded bolts that are retained in place using nuts screwed onto their distal ends to ensure that the pins remain in place and the telescoping portions 126, 128 maintain a fixed relationship for the desired length.

The adjustable length body 124 of the extension member 120 is attached to an angular junction 140. In the example shown, a commercially available one-to-one right angle gear box is used to transfer the direction of the switching perpendicular to the internal oil switch. Rotational motion of the handle 122 is translated through the adjustable length body 124 to one of the angular junction connection seats 142. The angular junction 140 translates the motion 90 degrees to a second of the angular junction connection seats 244 that is attached to the switch coupling member 110. Thus, the switch coupling member 110 rotates based upon rotation of the extension member 120. FIG. 4 shows the axis of rotation 446 of the handle 122 and the axis of rotation 448 of the rotary switch 450 on a 90 degree relationship.

In alternate configurations, the adjustable length body 124 could connect directly to the switch coupling member 110, the angular junction 140 could be between the handle 122 and the adjustable length body 124, or any combination of fixed and adjustable bodies could be present between handle 122 and angular junction 140 and/or angular junction 140 and the switch coupling member 110. In one embodiment, a common and detachable attachment mechanism is used between each piece and the user determines the configuration of bodies and angular junctions between the handle 122 and switch coupling member 110 as appropriate to their path for the switch extension device during installation.

Figure 5:
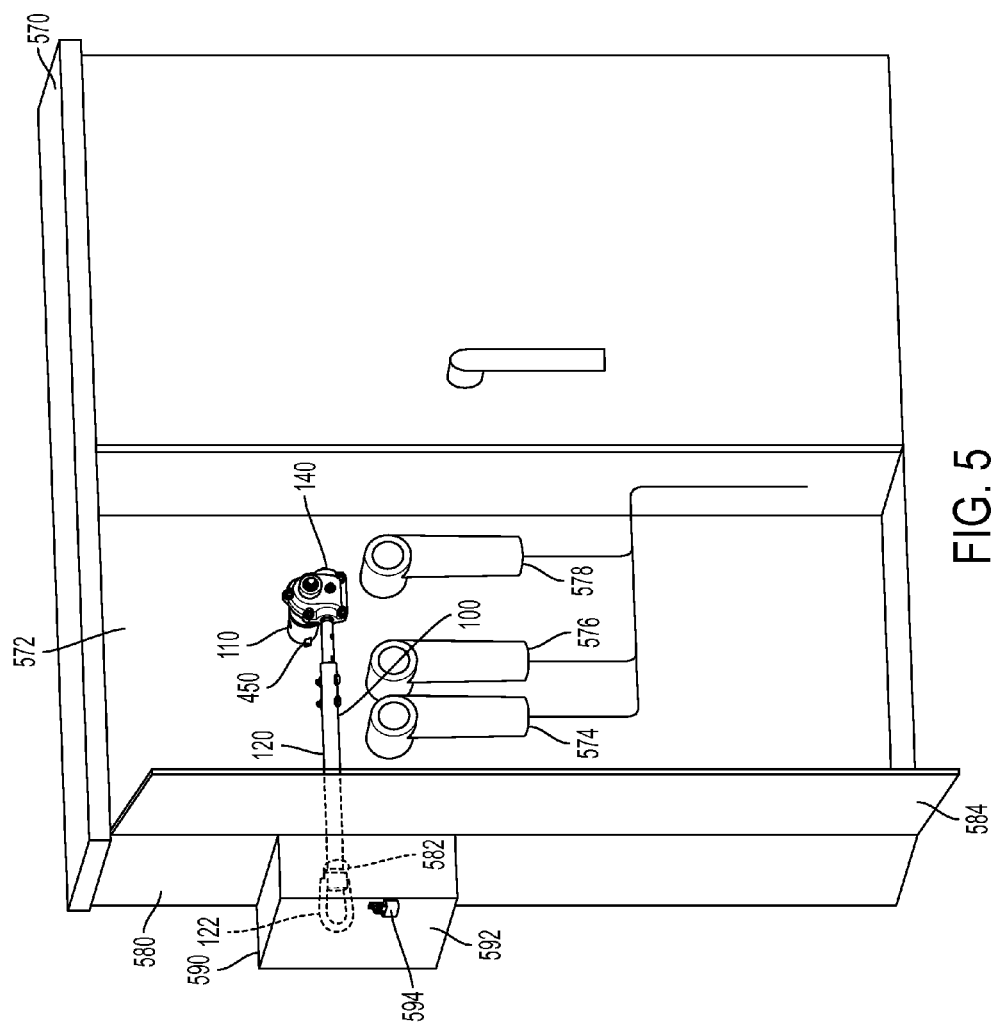

FIG. 5 shows the switch extension device 100 installed in the housing 570 of a unit of electrical equipment, such as a pad mounted transformer. The switch coupling member 110 is mechanically engaged to the rotary switch 450 of the electrical equipment 570, though it has not been fastened in place (a fastening pin has not been inserted into the through hole). The length of the switch coupling member 110 and the angular junction 140 define a distance from the switch face panel 572 for the path of the extension member 120. In the example electrical equipment 570, the switch face panel 572 provides access to both the rotary switch 450 and transformer terminals 574, 576, 578, which are active electrical components that are energized when the rotary switch 450 is in the on position and de-energized when the rotary switch 450 is in the off position. The installed switch extension device 100 follows a path that is clear of the active electrical components. The extension member 120 traverses the lateral distance from where the switch coupling member 110 engages the switch 450 through an opening 582 in exterior wall 580, such that the handle 122 is outside the housing 570. The opening 582 generally is not a factory standard opening in the equipment housing, but a new opening drilled or cut from the housing 570 and specifically sized to accommodate the extension member 120. The opening 582 may be made in a side wall or other exterior surface of the housing, which could include being made through a removable panel of the housing, or even through a door panel, vent panel, or other housing feature. For added security, a weatherproof and lockable external switch box 590 has been installed to cover the handle 122. The external switch box 590 includes a door 592 for accessing the handle 122 and a lock 594 for preventing manipulation of the external portion of the extension member 120 by an unauthorized user. Because the location of the switch and distance to the exterior wall of the housing will vary among different units of electrical equipment, the ability to customize the length of the extension member 120 is desirable. Various combinations of bodies (for distance) and angular junctions (for orientation) can enable more complex paths and selective location of the external access to the handle (and placement of the external switch box). In FIG. 5, the closable door 584 of the housing 570 is open to display the switch extension device 100. The door 584 would be opened for installation of the switch extension device 100, but would be closed (and generally locked) during normal operation of the electrical equipment, including when a service call is initiated. The service technician would only need to open the external switch box 590 and actuate handle 122 to turn the switch 450 from an on position to an off position, powering down the transformer terminals 574, 576, 578 before opening the door 584 or otherwise servicing the electrical equipment.

Figure 8:
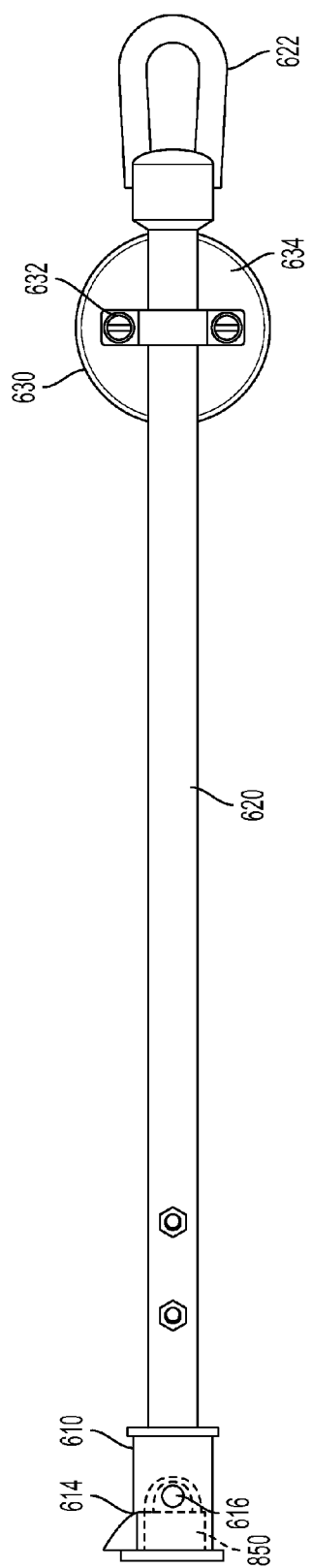
Figure 9:
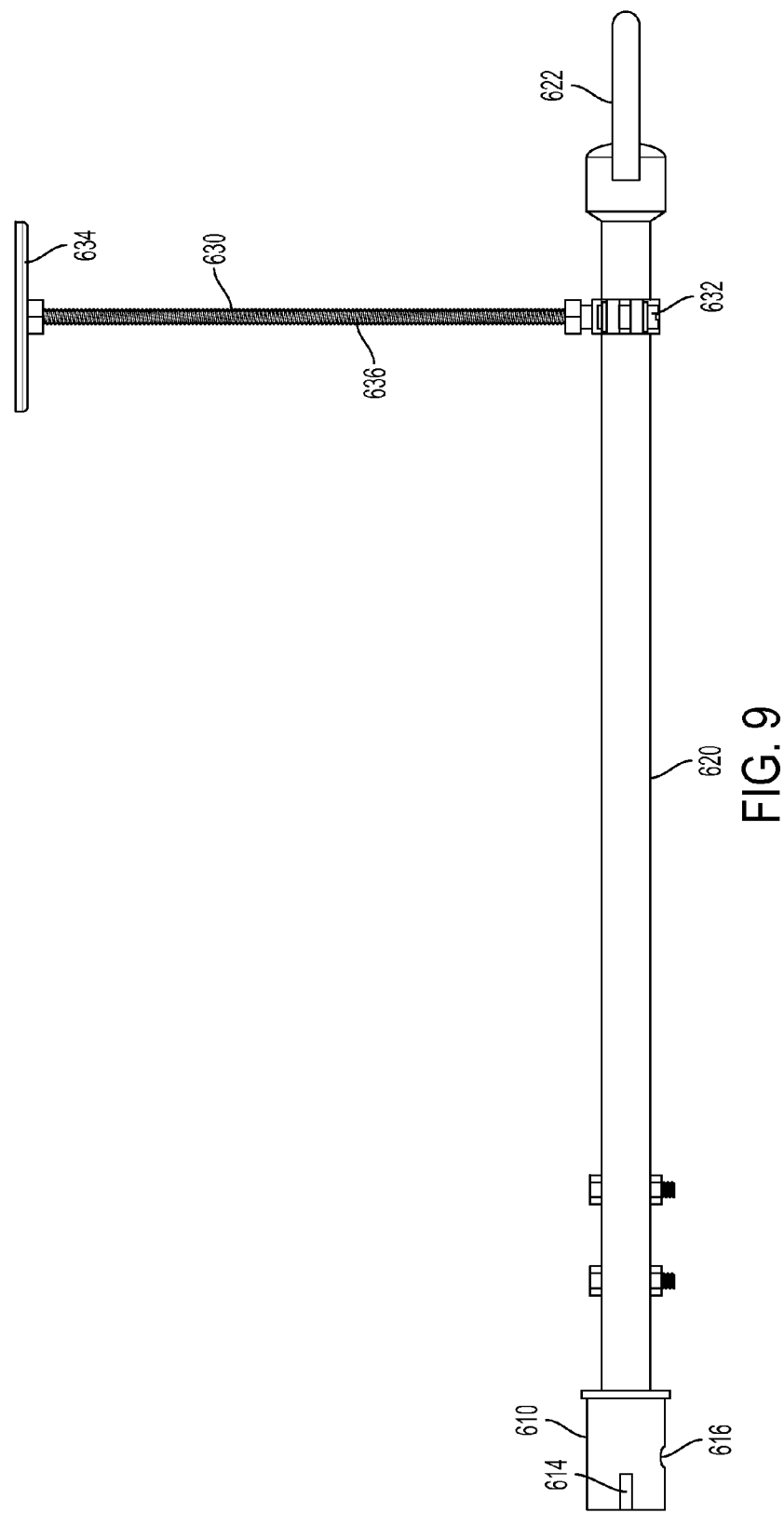

FIGS. 6-10 show an alternate example embodiment of a switch extension device. The switch extension device 600 is a straight switch extension that includes a similar switch coupling member 610 and extension member 620, but without the intervening angular junction. The switch coupling member 610 includes the cylindrical cup design with a slot 614 that accommodates a flange on the rotary switch and enables rotation of the switch coupling member 610 to rotate the switch. The switch coupling member 610 also includes a through hole 616 for fastening the switch extension device 600 to the switch. The extension member 620 may be a fixed length body connecting the switch coupling member 610 to the handle 622, which is the external portion of the extension member 620. Alternately, the extension member 620 could be a fully compacted telescoping adjustable length body held to its minimum length by the through bolts shown. Rotation of the handle 622 is directly translated through the rigid body of the extension member 620 and the switch coupling member 610 to the switch, without any need for more complex angular translation. FIG. 8 shows the switch extension device 600 mechanically engaging a rotary switch 850.

In addition, the switch extension device 600 further incorporates an optional stabilizing extension 630 that is anchored to the ceiling, floor, or another surface of the transformer housing or environment. In the example shown, the stabilizing extension 630 includes a guide member 632 for engaging and supporting the extension member 620, an anchor assembly 634 for anchoring the stabilizing extension 630 to a portion of the housing, and a supporting member 636 extending from the guide member 632 to the anchor assembly 634 and providing support from the housing to the extension member 620. The guide member 632 can be any component for supportively engaging the extension member 620 while not preventing or obstructing the movement necessary to actuate the switch. In the example embodiment, the guide member 632 is a pair of arcuate bands with flattened distal ends that can be used to removably attach them to one another to define a ring through which the extension member 620 can extend. This design enables the stabilizing extension 630 to easily be added or removed from the switch extension device 600. The anchor assembly 634 can include any mechanism for attaching the stabilizing extension to the housing. In the example embodiment, the anchor assembly is magnetized such that it will attach itself to the ferrous metal of the housing in whatever location is needed for installation. Other alternatives include the use of an adhesive pad, separately applied adhesive, or mechanical attachment, such as the use of through holes in both the anchor assembly and the housing accommodating nut and bolt fasteners. The supporting member 636 can be any structural body for fixing the distance between the guide member 632 and the anchor assembly 634. It can be a fixed length member, as shown in the example. By using a threaded body, it can be cut to the desired length and the guide member 632 and the anchor assembly 634 are attached using a compatible threaded attachment. Alternatively, it can be an adjustable body, using a telescoping configuration or similar approach. The stabilizing extension 630 may or may not be needed to support the extension member 620, depending on the configuration of the installation and whether adequate support can be provided at the transformer housing through point or external switch box. The stabilizing extension may also be used with some configurations of an angled switch extension device, such as switch extension device 100 in FIGS. 1-5.

Figure 10:
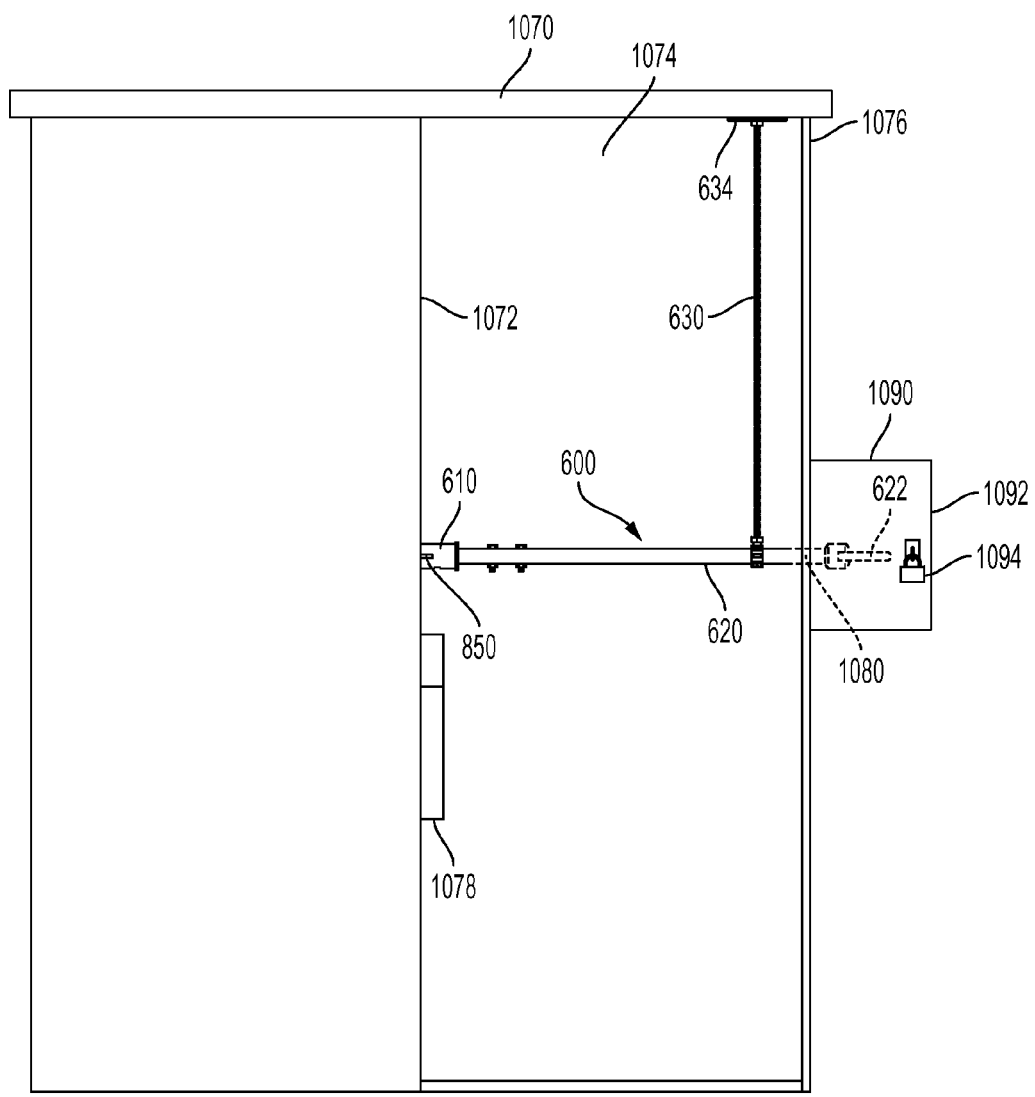

FIG. 10 shows a cutaway view (where the panel of the housing that would normally enclose the access compartment has been removed) of the switch extension device 600 installed in the housing 1070 of a unit of electrical equipment, such as a pad mounted transformer. The switch coupling member 610 is mechanically engaged to the rotary switch 850 of the electrical equipment 1070, though it has not been fastened in place (a fastening pin has not been inserted into the through hole). The length of the switch coupling member 610 and the extension member 620 define a distance from the switch face panel 1072 across the width of the access compartment 1074 and through exterior wall 1076. With the straight extension, the path of the switch extension device 600 will frequently extend through the closable access door in exterior wall 1076. FIG. 10 shows the installed switch extension device 600 with the closable access door in the closed position (and this indistinguishable from the walls of the housing). In the example electrical equipment 1070, the switch face panel 1072 provides access to both the rotary switch 850 and transformer terminals 1078, which are active electrical components that are energized when the rotary switch 850 is in the on position and de-energized when the rotary switch 850 is in the off position. The installed switch extension device 600 follows a path that is clear of the active electrical components. The extension member 620 traverses the lateral distance from where the switch coupling member 610 engages the switch 850 through an opening 1080 in exterior wall 1076, such that the handle 622 is outside the housing 1070. For added security, a weatherproof and lockable external switch box 1090 has been installed to cover the handle 622. The external switch box 1090 includes a door 1092 for accessing the handle 622 and a lock 1094 for preventing manipulation of the external portion of the extension member 620 by an unauthorized user. The extension member 620 is supported by the stabilizing extension 630 that is attached to the housing 1070 by the anchor assembly 634.

In one embodiment, the components of the switch extension could be provided to an installer as a kit. In one version of the kit, a switch extension device, such as the straight extension device described with regard to FIGS. 6-10 or the angled extension device described with regard to FIGS. 1-5, along with the external switch box and all needed fasteners. An alternate embodiment of the kit would provide various components of a switch extension device and enable the installer to customize the switch extension device for their application. For example, the kit could include one or more switch coupling members (perhaps with alternate configurations for engaging different types of switches), one or more handles or other end features, one or more fixed or adjustable length bodies, and one or more angular junctions that can be assembled into a switch extension for the desired path. The kit may also include a stabilizing extension for use if needed and a lock compatible with the external switch box.

Figure 11:
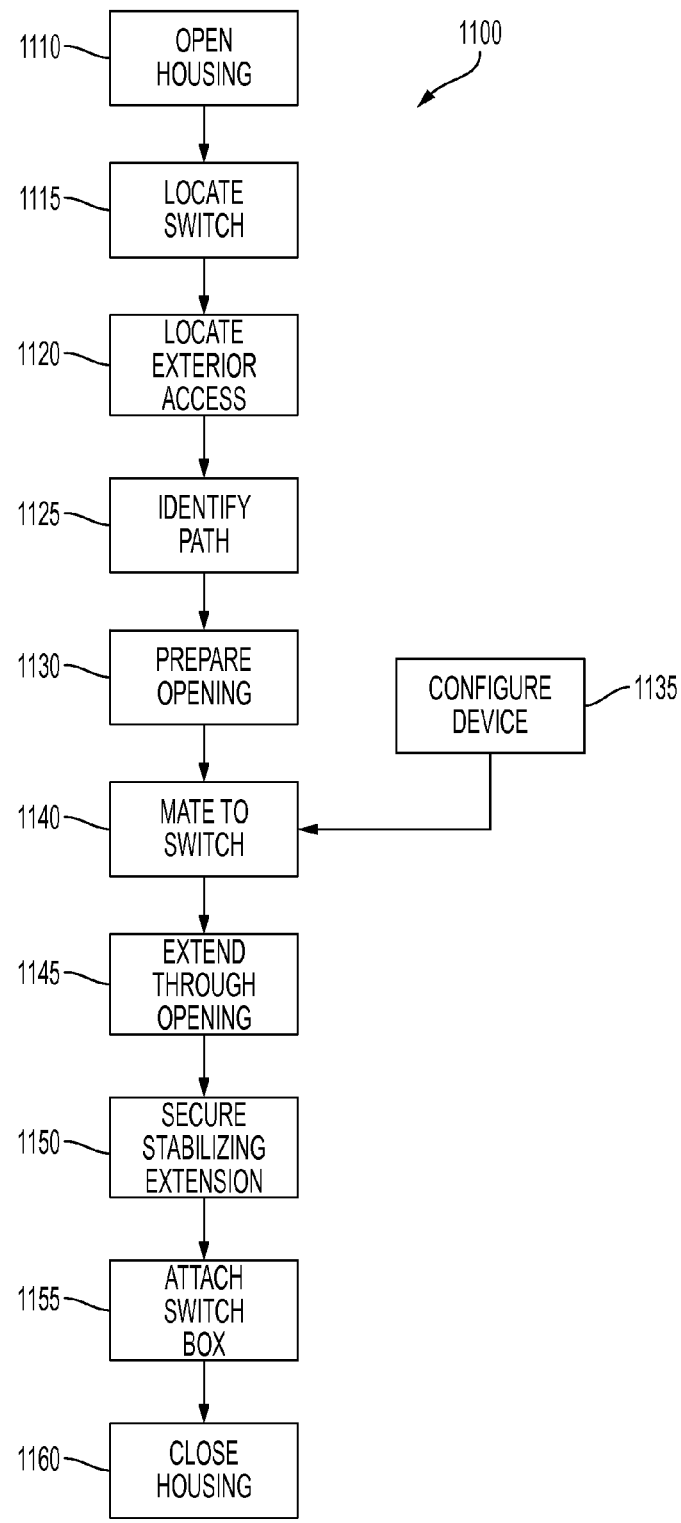

FIG. 11 shows a method of installing a switch extension. The switch extension installed may be used for the straight extension device described with regard to FIGS. 6-10, the angled extension device described with regard to FIGS. 1-5, a switch extension kit, or an alternate configuration of a switch extension device. In step 1110, an installer opens the housing of the electrical equipment, generally using a door or removable access panel for accessing the safety switch. For example, a service technician may open the transformer terminal cabinet of a pad mounted transformer. In step 1115, the installer determines the location of the internal switch within the housing. In step 1120, the installer determines the location of the exterior access point from which a user will be able to physically access the switch extension without opening the housing. In step 1125, based on the location of the internal switch and the exterior access point, the installer determines a path for the switch extension device. In step 1130, the installer prepares and opening in the housing, such as a through hole cut in the transformer housing at the desired location for the exterior access point. If the switch extension device being used includes multiple arrangements of components or adjustable length members, the installer configures the device in step 1135. If a fixed switch extension, straight or angled, is being used, the location of the external access point will be defined by the location of the internal oil switch and the geometry of the switch extension device and step 1135 is unnecessary. If an adjustable switch extension is being used, then the length of the primary extension member, any secondary extension member, and angular junction (if adjustable) are set to match the desired path from the internal switch to the external access point. In step 1140, the switch extension is mated to the internal switch to enable mechanical manipulation of the switch by the switch extension. In some embodiments, the installer will fasten the switch extension to the switch. In step 1145, the switch extension device is extended through the prepared opening such that a portion of its end, generally a handle, is accessible from the exterior of the housing. Depending on the configuration of the switch extension, the geometry of the housing, and the preferences of the installer, steps 1140 and 1145 may be reversed as needed. If the switch extension device requires additional support, one or more stabilizing extensions securing the switch extension device to the housing may be installed in step 1150. In most installation, the installer will attach an external switch box to the housing to cover the opening at the external access point and the external portion of the switch extension device in step 1155.

When the switch extension device is in place and the installer has confirmed that physical manipulation of the external portion of the extension member of the device is mechanically translated to the switch coupling member of the device for mechanically manipulating the switch between at least the first switch position and the second switch position, correlating to on and off, the housing is closed (and preferably locked) in step 1160. Once installed, a service technician may access and operate the external switch to turn the internal switch on and off (between a first switch position and a second switch position) without opening the housing of the electrical equipment.

The invention claimed is:

1. A device comprising:
 a switch coupling member for mechanically manipulating a switch between at least a first switch position and a second switch position, and wherein the switch coupling member includes a fastener that attaches the switch coupling member to the switch, the switch being disposed inside a closed housing containing components that are electrically charged when the switch is in the first position and not electrically charged when the switch is in the second position;
 an extension member having an external portion that extends outside of the closed housing for access by a user without opening the closed housing and whereby physical manipulation of the external portion of the extension member is mechanically translated to the switch coupling member for mechanically manipulating the switch between at least the first switch position and the second switch position, and
 wherein the switch includes a switch through hole and the switch coupling member includes a coupling member through hole and the fastener is a bolt that extends through the switch through hole and the coupling through hole.

2. The device of claim 1, further comprising a stabilizing extension comprising:
 a guide member for engaging and supporting the extension member;
 an anchor assembly for anchoring the stabilizing extension to a portion of the closed housing; and
 a supporting member extending from the guide member to the anchor assembly and providing support from the closed housing to the extension member.

3. The device of claim 1, wherein the external portion of the extension member comprises a handle for physical manipulation by a user.

4. The device of claim 3, wherein the switch has a switch structure for direct physical manipulation of the switch and the handle has a handle structure for physical manipulation by the user and wherein the switch structure and the handle structure are functionally equivalent structures.

5. The device of claim 1, wherein an external switch box is disposed outside of the closed housing and the external portion of the extension member extends into the external switch box.

6. The device of claim 5, wherein the external switch box includes a lock for preventing manipulation of the external portion of the extension member by an unauthorized user.

7. The device of claim 1, wherein the extension member has an adjustable length and a setting mechanism for setting the adjustable length to a desired length during installation.

8. The device of claim 7, wherein the extension member comprises a first telescoping portion and a second telescoping portion in a telescoping arrangement for adjusting the adjustable length and the setting mechanism is a removable pin extending through a first hole in the first telescoping portion and an aligned second hole in the second telescoping portion when the adjustable length is locked to the desired length.

9. The device of claim 1, wherein the extension member comprises an angular junction whereby an angle of the mechanical manipulation of the switch by the switch coupling member is different from an angle of the physical manipulation of the external portion of the extension member.

10. The device of claim 9, wherein the angle of the mechanical manipulation of the switch by the switch coupling member and the angle of the physical manipulation of the external portion of the extension member is different by 90 degrees.

11. The device of claim 1, wherein the switch coupling member accommodates a rotary switch and mechanically manipulating the switch comprises rotating the switch between the first switch position and the second switch position.

12. The device of claim 11, wherein the switch coupling member is a cylindrical cup with an internal diameter greater than a diameter of a rotating portion of the rotary switch and the cylindrical cup includes a switch manipulation feature such that rotation of the cylindrical cup rotates the rotating portion of the rotary switch.

13. The device of claim 12, wherein the switch manipulation feature is a slot in the cylindrical cup that accommodates a flange extending from the rotating portion of the rotary switch.

14. A device comprising:
 a switch coupling member for mechanically manipulating a switch between at least a first switch position and a second switch position, the switch being disposed inside a closed housing containing components that are electrically charged when the switch is in the first position and not electrically charged when the switch is in the second position;
 an extension member having an external portion that extends outside of the closed housing for access by a user without opening the closed housing and whereby physical manipulation of the external portion of the extension member is mechanically translated to the switch coupling member for mechanically manipulating the switch between at least the first switch position and the second switch position;
 wherein the extension member comprises an angular junction whereby an angle of the mechanical manipulation of the switch by the switch coupling member is different from an angle of the physical manipulation of the external portion of the extension member; and
 wherein the angular junction comprises a gear box for translating rotational motion from the external portion of the extension member to rotational motion of the switch coupling member and the switch.

15. The device of claim 14, wherein the external portion of the extension member comprises a handle for physical manipulation by a user and the switch has a switch structure for direct physical manipulation of the switch and the handle has a handle structure for physical manipulation by the user and wherein the switch structure and the handle structure are functionally equivalent structures.

16. The device of claim 14, wherein an external switch box is disposed outside of the closed housing and the external portion of the extension member extends into the external switch box.

17. The device of claim 14, further comprising a stabilizing extension comprising:
- a guide member for engaging and supporting the extension member;
- an anchor assembly for anchoring the stabilizing extension to a portion of the closed housing; and
- a supporting member extending from the guide member to the anchor assembly and providing support from the closed housing to the extension member.

18. The device of claim 14, wherein the angle of the mechanical manipulation of the switch by the switch coupling member and the angle of the physical manipulation of the external portion of the extension member is different by 90 degrees.

19. The device of claim 14, wherein the extension member has an adjustable length and a setting mechanism for setting the adjustable length to a desired length during installation.

20. The device of claim 19, wherein the extension member comprises a first telescoping portion and a second telescoping portion in a telescoping arrangement for adjusting the adjustable length and the setting mechanism is a removable pin extending through a first hole in the first telescoping portion and an aligned second hole in the second telescoping portion when the adjustable length is locked to the desired length.

21. The device of claim 14, wherein the switch coupling member accommodates a rotary switch and mechanically manipulating the switch comprises rotating the switch between the first switch position and the second switch position.

22. The device of claim 21, wherein the switch coupling member is a cylindrical cup with an internal diameter greater than a diameter of a rotating portion of the rotary switch and the cylindrical cup includes a switch manipulation feature such that rotation of the cylindrical cup rotates the rotating portion of the rotary switch.

23. The device of claim 22, wherein the switch manipulation feature is a slot in the cylindrical cup that accommodates a flange extending from the rotating portion of the rotary switch.

* * * * *